United States Patent
Kornblum

(10) Patent No.: US 7,346,931 B2
(45) Date of Patent: Mar. 18, 2008

(54) ACCEPTING A SET OF DATA IN A COMPUTER UNIT

(75) Inventor: Christian Kornblum, Oberderdingen (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 10/523,900

(22) PCT Filed: Jul. 10, 2003

(86) PCT No.: PCT/DE03/02309

§ 371 (c)(1),
(2), (4) Date: Sep. 22, 2005

(87) PCT Pub. No.: WO2004/017182

PCT Pub. Date: Feb. 26, 2004

(65) Prior Publication Data

US 2006/0150052 A1    Jul. 6, 2006

(30) Foreign Application Priority Data

Aug. 2, 2002    (DE) .............................. 102 35 381

(51) Int. Cl.
  *G06F 7/04*    (2006.01)
  *G06F 12/14*   (2006.01)
  *G06F 12/16*   (2006.01)
  *H04L 9/00*    (2006.01)
  *H04L 9/32*    (2006.01)

(52) U.S. Cl. ............................ 726/30; 726/26; 726/27; 726/28; 726/29; 713/187; 713/188; 713/189; 713/190; 713/191; 713/192; 713/193; 713/194; 380/227; 380/228; 380/229; 380/230; 709/217; 709/218; 709/219

(58) Field of Classification Search .................. 726/30
See application file for complete search history.

(56) References Cited

U.S. PATENT DOCUMENTS 5,421,006 A  *  5/1995  Jablon et al. .................. 714/36
5,630,054 A  *  5/1997  Trang ........................... 714/52

(Continued)

FOREIGN PATENT DOCUMENTS

| CN | 1231787    | 10/1999 |
|----|------------|---------|
| DE | 100 43 499 | 3/2002  |
| EP | 0 706 275  | 4/1996  |
| EP | 0 997 807  | 5/2000  |
| WO | 02 48874   | 6/2002  |

*Primary Examiner*—Ayaz Sheikh
*Assistant Examiner*—Longbit Chai
(74) *Attorney, Agent, or Firm*—Kenyon & Kenyon LLP

(57) ABSTRACT

A method for transferring at least one data record from an external data source into a processor unit, e.g., and a suitably designed processor unit are described. In such a method for transcribing at least one data record from the external data source to a processor unit, the at least one data record is transmitted from the external data source together with additional information to a buffer memory of the process unit. A check of the admissibility of using the at least one data record is performed on the basis of the additional information. A blocking signal is generated when the check reveals that use of the at least one data record is not allowed. The at least one data record is then deleted from the buffer memory. An enable signal is generated when the use of the at least one data record is allowed. The additional information includes an identifier assigned individually to the processor unit, with the validity check being performed in the processor unit.

13 Claims, 2 Drawing Sheets

U.S. PATENT DOCUMENTS 5,844,986 A     12/1998   Davis
5,956,408 A      9/1999   Arnold
6,678,833 B1 *    1/2004   Grawrock ................... 713/401
2002/0042878 A1 *    4/2002   Westendorf et al. ........ 713/169
2002/0147918 A1 *   10/2002   Osthoff et al. .............. 713/193

* cited by examiner

ACCEPTING A SET OF DATA IN A COMPUTER UNIT

FIELD OF THE INVENTION

The present invention relates to a method for transferring at least one data record from an external data source to a processor unit, as well as the processor unit designed accordingly.

BACKGROUND INFORMATION

According to the method described in German Published Patent Application No. 100 43 499, at least one data record, which may be, for example, program code or information stored in a memory of a processor unit for further use and then used in the course of a program, is transmitted to a processor unit such as a control unit of a motor vehicle. The at least one data record is transmitted together with additional information, for example as a cohesive data packet, from the data source to the processor unit. The processor unit loads the transmitted data into a buffer memory belonging to it. The processor unit then establishes contact with an external checking unit, in particular by remote data transmission, identifies itself with the external checking unit and transmits to the latter at least a portion of the additional information. On the basis of the transmitted portion of the additional information and the identity of the processor unit, the external checking unit verifies whether or not the use of the at least one data record in the processor unit is allowed. Depending on the result of this check, the processor unit transmits either an enable signal or a blocking signal. In the case when the blocking signal is transmitted, the at least one data record is deleted from the buffer memory. Otherwise the at least one data record thus transmitted is used in the processor unit.

It is desirable if the data records stored in processor units such as the control units in motor vehicles are modifiable externally. This may be accomplished, for example, for the purpose of updating such control units without having to replace the control unit. Data records may be transmitted to the control unit via remote data transmission or via a suitable interface connected to the processor unit such as a diagnostic interface of a motor vehicle. The data records are provided on a data source, which may be data memories or data processing devices.

It is first important to ensure that only authorized data records are transmitted to and used by the processor unit. Any unallowed change in the data records or input of data records that have not been enabled should be prevented because using non-enabled data records may cause problems in operation of the processor unit or other processor units connected to that processor unit. Furthermore, the upload procedure should be as simple as possible.

SUMMARY OF THE INVENTION

In the method according to the present invention for transcribing at least one data record from an external data source to a processor unit having the features of claim 1, the at least one data record is transferred together with additional information from the external data source to a buffer memory of the processor unit. The reliability of using the at least one data record is checked on the basis of the additional information. A blocking signal is generated if the check reveals that use of the at least one data record is not allowed. The at least one data record is then deleted from the buffer memory. An enable signal is generated when the use of the at least one data record is allowed. According to the present invention, the additional information includes an identifier assigned individually to the processor unit, the validity check being performed in the processor unit.

Additional information containing an identifier is thus attached to the data record. A check is performed in the processor unit to determine whether the identifier is valid, i.e., whether it conforms to certain check criteria. If this is the case, the enable signal is generated; otherwise the blocking signal is generated. The identifier is assigned individually to the processor unit, so an identifier valid for a given processor unit will be invalid for all other processor units, including those of the same design series. Data records may thus be transcribed individually for each individual processor unit, and data records may not be copied from one processor unit to another processor unit of the same design. The identifier is preferably a data word generated by a code word generator which may be a random generator in particular. The data word generated by the code word generator may be, for example, a sequence of characters or numbers such as a hexadecimal numerical sequence.

This procedure has the advantage that the check on the validity is performed in the processor unit itself and no manipulable data communication with other external devices is necessary for the check. Furthermore, a check may be performed continuously or periodically with the identifier in the processor unit to determine whether or not the version currently being used is valid. At the point in time of transcription of the at least one data record together with the additional information to the processor unit, no other communication devices need be involved. Even when a remote data transmission from the vehicle is impossible, e.g., temporarily, an update may be performed and the at least one data record may be transferred, assuming it is valid.

According to an advantageous embodiment of the present invention, a signature is part of the additional information; the signature may also include the identifier used to prevent a replacement of the at least one valid data record, which is to be transferred together with additional information, with another data record, in particular one that is not valid. The check on the integrity and acceptability of the signature is then in particular also a part of the check on the validity of the transmitted data.

According to a preferred embodiment of the present invention, an identifier is valid only once for checking the at least one transmitted data record stored in a buffer memory. This prevents the identifier from being intercepted in a transfer and then used for transcribing other unauthorized data records.

According to another embodiment of the present invention, when the enable signal is generated, the at least one data record is transmitted from the buffer memory into a functional memory from which it is outputtable for processing purposes. This measure advantageously ensures that the data record is transmitted to the functional memory only at a point in time when its validity has already been checked with a positive outcome. Thus for transcribing another data record which is recognized as valid, the last version of the data record recognized as valid is always stored in the functional memory and read for use there. The data record stored in the functional memory is not affected by attempts to download invalid data records. This always ensures the availability of the processor unit. In addition, it is also possible for the identifier to be stored in the functional memory together with the at least one data record and for the particular identifier to be checked for validity when calling up a data record from the functional memory. This is possible even when the identifier is suitable only for a single check of a transcribed data record because the data record is now stored in the functional memory and is no longer stored in the buffer memory and a new identifier is necessary only for checking data stored in the buffer memory. This makes it possible to prevent manipulation of the data record stored in the functional memory, e.g., by exchanging the memory module containing the functional memory. This check may also be performed only at periodic intervals, e.g., after starting the vehicle or after a predetermined number of calls.

In another advantageous embodiment of a method according to the present invention, a list of code words is stored in a code word memory in the processor unit. The identifier transmitted together with the at least one data record is compared with the code word. It is found to be reliable if the identifier of the additional information transmitted with the at least one data record matches the code word and/or if the combination of the identifier and the code word conforms to a criterion to be checked. For example, the identifier and code word may be two key parts of a code, with the combination of code word and identifier together permitting encryption and/or decryption of a coded data sequence, so that it is possible to check on whether the code word and the identifier fit together. In a more extensive embodiment, a counter is provided in the processor unit and its counter content is stored. The counter content points to a code word of the code word memory. The counter is incremented before each check of an identifier of the at least one data record stored in a buffer memory, so that a code word may be used only once for checking newly downloaded data records.

It is important that the list of code words is not outputtable or overwritable. For this purpose no protocol instructions which would allow reading from or writing to the memory area using the numbers via an external interface are allowed in the processor unit. Additionally or alternatively, the processor unit may be protected from access via hardware pins by embedding. The counter content must be permanently stored and must be preserved even without a power supply. The counter content may be stored in an EEPROM in particular. According to a preferred embodiment of the list of code words, they should take up the smallest possible memory volume in the processor unit; on the other hand, the length of the code word should be selected so that it is impossible to discover it by guessing or trial and error. The code word length of 32 bits, for example, i.e., four bytes or two hexadecimal numbers, would be one possible compromise between security and memory volume. The memory required for a code word list of 256 code words would then be one kbyte. Since a memory volume in the range of one Mbyte or more is also available in control units in motor vehicles, a memory volume of one kbyte is a relatively small volume. In an advantageous embodiment, the number of code words in the list should also be selected to be as small as possible but should be adapted to the demand for transcription of data records to the processor unit during its lifetime. Although a cyclic run through the list of code words may also be possible, the code words could also be discovered by a third party due to their repeated use, which results in a certain laxity in terms of security.

As protection against discovery of the required identifier to be transcribed, it is possible to provide for a new identifier to be necessary for each attempted transcription of at least one data record. On the other hand, it should be noted that the data transmissions may also have interference and therefore multiple transmission attempts may be required under some circumstances until the at least one data record and the additional information are transmitted to the buffer memory. To avoid having to input a new identifier into the additional information for each transmission attempt while at the same time using a large number of code words, it is possible to provide for the check on the identifier not to take place until the thoroughness and accuracy of the transmission of the data to the buffer memory have been ascertained. To do so, in particular the data stored in the buffer memory or a signature derived therefrom may be compared with the data of the data source. Confirmation by the operator may also be requested, in which case the operator must acknowledge the transmission as being in order before the check of the identifier is performed. Since a different code word is used and thus also spent with each check of the identifier in the processor unit, discovery of the required identifier by systematic trial and error is impossible.

Additionally or alternatively, it is also possible that after a defined number of false attempts, an equal number of successive identifiers must also be transmitted as additional information and checked for validity. It is also conceivable to provide a delay element which increases the time required for an individual attempt so that not all possibilities may be checked out within a foreseeable period of time.

According to a preferred embodiment of a method according to the present invention, the processor unit is identifiable based on an identification sequence. The identification sequence is preferably also part of the additional information and may be used in checking the validity of the at least one data record. By linking the identification sequence to the additional information, it is possible to check on whether the at least one data record is also intended for input into the processor unit. The identification sequence is in particular a character sequence which may be read in the processor unit but may not be overwritten; it is assigned individually to the processor unit and is issued only once and thus differentiates the processor unit from all other processor units of the same design.

According to an advantageous embodiment, to perform the method according to the present invention, valid identifiers, preferably in the form of a list, are stored in an identifier server assigned to the corresponding processor unit, e.g., via the identification sequence, for at least one control unit, but preferably for a plurality of control units. The counter content of the counter of the processor unit is preferably stored here together with the identifiers, so that the code word server always knows the next identifier to be used, which may be transmitted to an authorized party on request, for example. It is possible for the authorized party to request the required identifier from the identifier server and then establish the link between the identifier and the other additional information as well as the at least one data record. It is also possible for the authorized party to transmit the data required by it to the identifier server and then to process the at least one data record and the additional information in the identifier server in particular using additional security measures such as encryption and addition of signatures. A total data record to be transmitted to the buffer memory is generated and then is transmitted to the authorized party for input into the processor unit or is transmitted directly to the processor unit. In the latter option, a check may be performed in the identifier server to determine whether it is allowed to input the at least one data record into the processor unit before the additional information has been appended to the identifier.

If the identifier is transmitted to the data source, it is only possible to check on whether it is authorized to generate and/or transcribe allowed data records. Due to the required query at the identifier server for determining the required identifier, it is possible to document a history of accesses in the identifier server. It is then possible to trace the accesses back. Therefore, e.g., in cases of misuse of identifiers that have been issued, it is possible to ascertain the source of the misuse.

A processor unit according to the present invention has a buffer memory and an overwritable functional memory, both of which are used for storing at least one data record. The functional memory is accessed during the operation of the processor unit. At least one data record together with additional information is transferrable to the buffer memory via an interface. A check unit for checking the validity of the at least one data record on the basis of an identifier contained in the additional information according to one of the preceding methods is contained in the processor unit. According to a preferred embodiment of the present invention, the processor unit has a read-only code word memory. Code words are stored in the code word memory. A counter having an incrementable counter content is assigned to the code word memory. The counter preferably points to a code word in a list of code words of the code word memory, in particular of code words that may be used only once. The processor unit in particular is individualized via an identification sequence. In the case of a processor unit according to the present invention, this is preferably a control unit for a motor vehicle.

DETAILED DESCRIPTION

Figure 1:
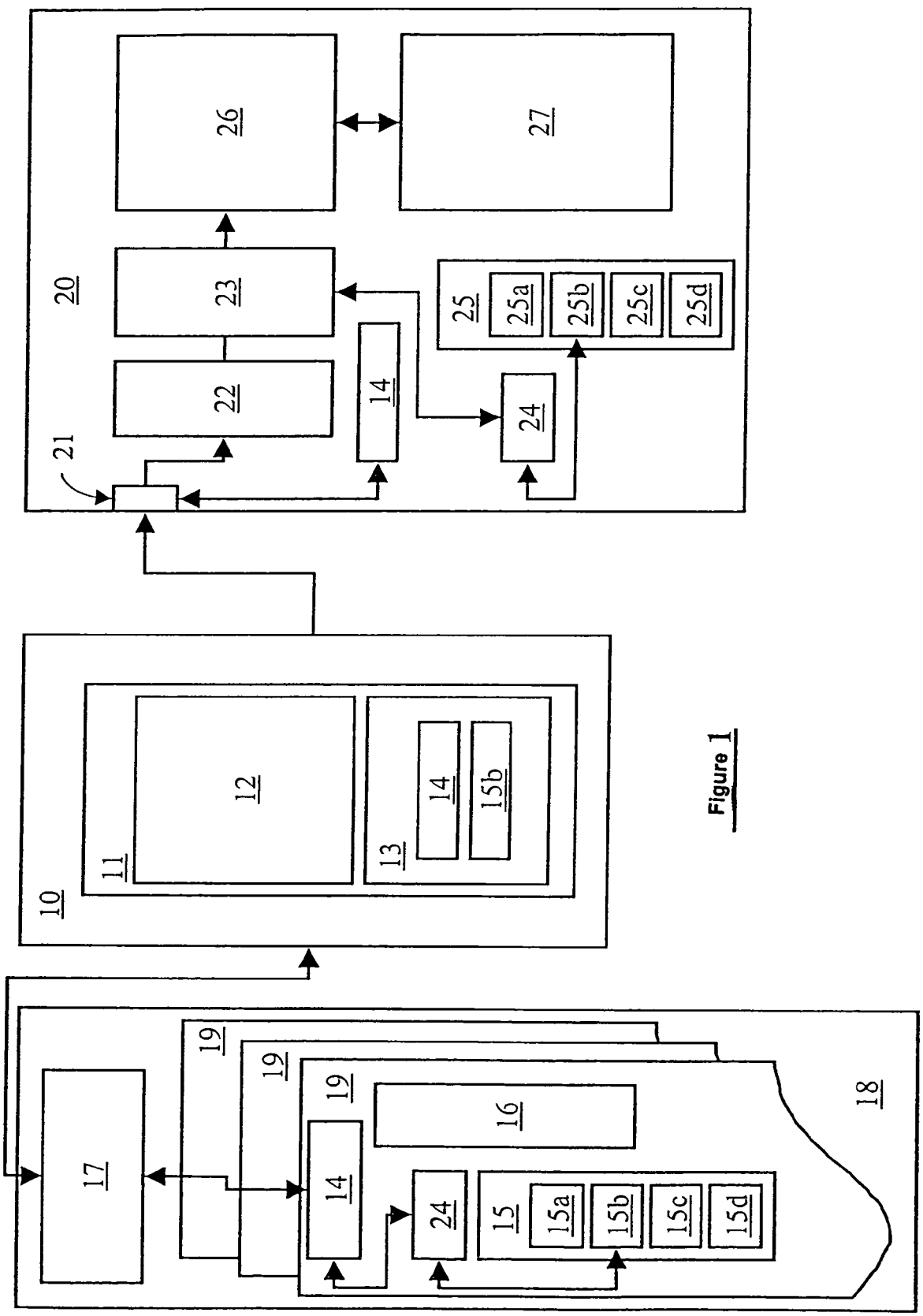
FIG. 1 shows schematically a block diagram of the identifier server, the data source and the processor unit.

FIG. 1 shows schematically the functional elements that cooperate in implementing a method according to the present invention. At least one data record 12 is to be transmitted from data source 10 to processor unit 20. Data source 10 is, for example, a data processing device which is prepared in a factory or service shop, while processor unit 20 may be a control unit in a motor vehicle. In addition, an identifier server 18 which is also required is provided and managed centrally by the automobile manufacturer and thus ensures good and reliable access control to the code words.

Processor unit 20 has an interface 21 for transcribing data. Buffer memory 22 is used for storing the data incoming at interface 21. The validity of the data stored in the interface is checked in checking unit 23, which accesses an element of the list of code words 25a, 25b, 25c, 25d of code word memory 25 via counter 24. If the data is recognized as valid, it may be transferred in a controlled manner via the checking unit from buffer memory 22 into functional memory 26. A central computer 27 of the processor unit, a CPU, accesses functional memory 26 to process tasks. Programs that are capable of running on CPU 27 may be stored in functional memory 26 with suitable encryption along with information that is necessary during the execution of a program such as parameter values, engine characteristics maps and the like. Programs as well as information used in running programs may therefore be input to processor unit 20 by a method according to the present invention. The processor unit is identifiably individualized by identification sequence 14, which is readably stored.

Data source 10 is a total data record 11 which is to be transcribed to processor unit 20. Data source 10 may be data processor units, shop instruments or data media, in particular read-only data media. Total data record 11 is divided into at least one data record 12, which is to be introduced into functional memory 26 and contains the program code and/or the information required during the running of a program plus additional information 13. The additional information includes at least one identifier 15b, but may also contain other information such as an identification sequence 14.

In identifier server 18, one identifier data record 19 is stored for a plurality of processor units 20. Identifier data record 19 is identifiable via identification sequence 14 and is assignable to processor unit 20 having the same identification sequence 14. An identifier data record 19 contains a counter 24 whose counter content is incremented each time an element is called up from the list of identifiers 15a, 15b, 15c, 15d of identifier memory 10. In addition, there is a protocol data file 16 in which the output of each individual identifier 15a, 15b, 15c, 15d to a data source 10 together with the receiver, the transmission path and the point in time of the transmission, for example, are recorded. The transmission of information between identifier server 18 and data source 10 may be accomplished by remote data transmission, e.g., wireless, Internet or the like. In the first examples of processor unit 20, the list of identifiers 15a, . . . , 15d of code word memory 15 and the list of identifiers 25a, . . . , 25d of code word memory 25 are generated using data and stored in corresponding memories 15, 20.

Figure 2:
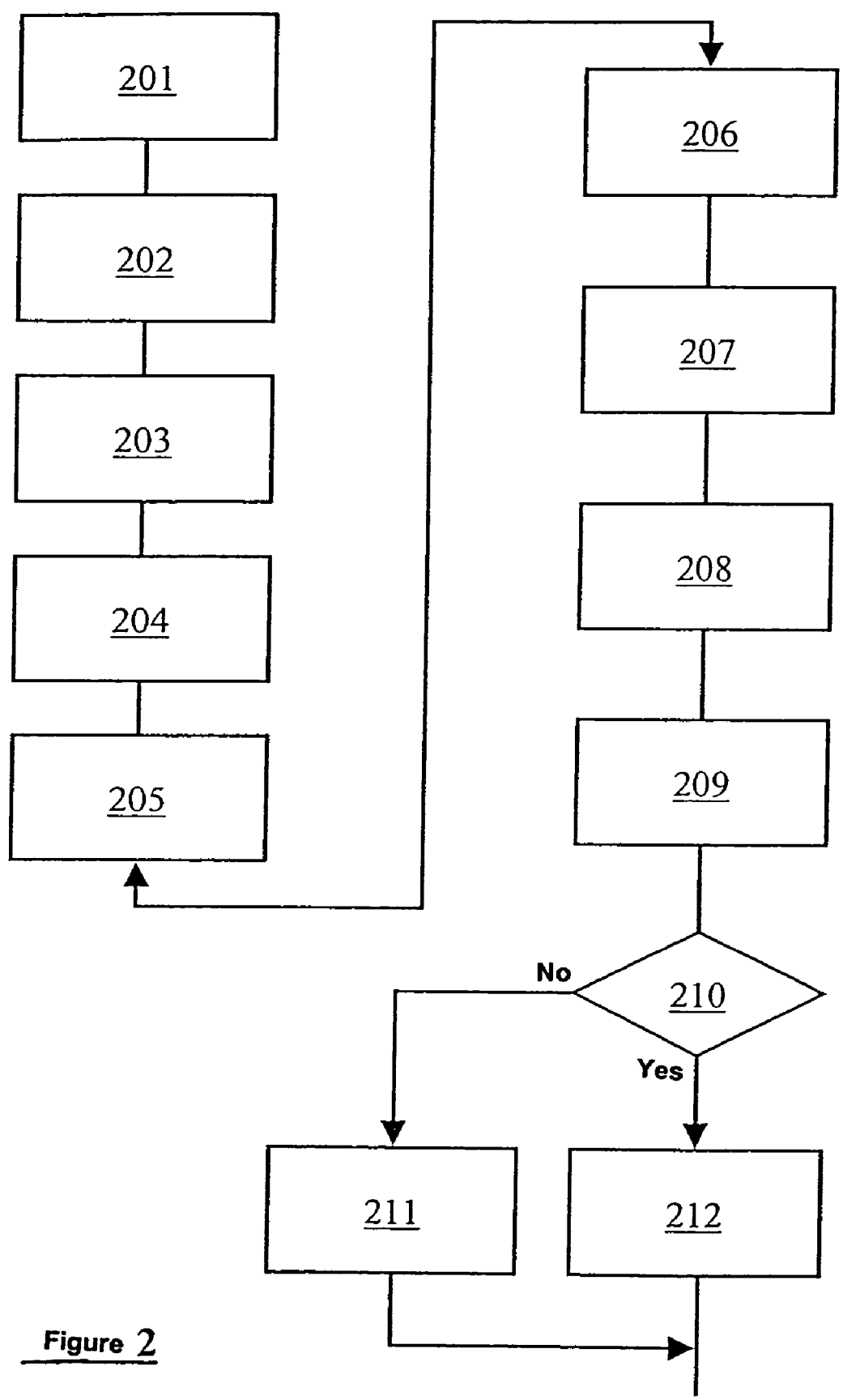
FIG. 2 shows a flow chart of a method according to the present invention.

FIG. 2 shows the flow chart of a method for transmitting at least one data record 12 to processor unit 20, as implementable, for example, in a configuration of computer 20, data source 10 and identifier server 18 according to FIG. 1. Steps 201 through 205 illustrate the steps performed before the actual transmission of the at least one data record 12, while steps 206 through 212 are the steps performed in the actual data transmission.

According to step 201 of the method, the at least one data record 12 which is to be transmitted to processor unit 20 is made available. According to step 202, processor unit 20 is then identified, e.g., by readout of identification sequence 14 over interface 21. Alternatively, the identification may also be performed manually by reading identification sequence 14 which is readably stored in processor unit 20 and by detecting it manually or via an optical reader.

According to step 203, identifier server 18 is then queried for the required identifier. The identification sequence previously read is therefore transmitted to the identifier server. On the basis of the identification sequence, identifier data record 19 assigned to specific processor unit 20 is accessed in the identification server. It is also possible here for the current counter content of counter 24 of the processor unit to be transmitted for the purpose of synchronization of the counter contents. A check is performed to determine whether it is permissible to transmit the identifier to the inquiring unit; if this is not the case, access is refused and the method is then terminated. A check may also be performed to determine whether data records 12 which are intended for transcription have been enabled and are allowed to be transcribed. This transfer thus takes place only to an authorized and identified inquiring unit.

If allowed according to step 204 of the method, valid identifier 15b of identifier list 15 is output next. Counter 24 of identifier server 18 is first incremented, but before that, there may be a matching to a transferred counter content so that the counter content points to the next identifier which has not yet been used. According to the counter content which then prevails (which is 2 in the example shown in FIG. 1), an identifier 15b of identifier memory 15 assigned to the counter content is read and transmitted to the data source. At the same time, protocol data file 16 is supplemented by the information assigned to the new query of the identifier.

According to step 205, complete data packet 11 is then generated in data source 10. The complete data packet is composed of the at least one data record 12 and additional information 13 assigned to it; in the exemplary embodiment depicted in FIG. 1, this is made up of identifier 15b transmitted from identifier server 18 and identification sequence 14; additional information 13 may also contain additional data. Thus on conclusion of step 205, a total data record 11 is available and may be transmitted to processor unit 20. The actual transcription of the at least one data record 12 to processor unit 20 may take place at a separate time and place from these preparatory steps. To do so, according to step 206, first complete data packet 11 is transmitted via interface 21 to buffer memory 22. The check of the transmitted data for validity is started by checking unit 23 by terminating the transmission and optionally after confirming the successful conclusion of the transmission procedure, which may also be generated by an operator, for example.

For this purpose, according to step 207, checking unit 23 first accesses counter 24, whose counter content is incremented accordingly with this access. The counter content points to a code word 25a, 25b, 25c, 25d of code word list 25 according to step 208; in the case shown in FIG. 1 at counter content 2, to code word 25b, which is then transmitted back to checking unit 23.

According to step 209, a check is performed on the basis of code word 25b and identifier 15b to determine whether the at least one data record 12 is valid and may be stored in the processor unit. The check may include in particular a comparison to look for a match between code word 25 and identifier 15b. If it is found according to step 210 that the data record is not valid, then the blocking signal is generated and the program jumps back to step 211. According to step 211, the data stored in buffer memory 22 is then erased and the method is terminated without transferring the at least one data record 12 to functional memory 26. Thus the at least one data record 12 cannot be used in central processor CPU 27 of processor unit 20. The transmission is thus terminated unsuccessfully.

If validity is recognized in step 210, the enable signal is generated and the program jumps to step 212 and at least the at least one data record is transmitted from buffer memory 22 to functional memory 26. In its operation, central computer 27 of processor unit 20 accesses functional memory 26, taking into account the data stored in functional memory 26, which may include both program code for central processor 27 and information queried in executing a program, e.g., engine characteristic maps and control parameters. During this transmission procedure, data contained in the functional memory and to be replaced may be overwritten. To do so, functional memory 27 may be in particular a flash memory which may be supplied with new data by flashing. The transmission method is then terminated.

What is claimed is:

1. A method for transcribing at least one data record of an external data source to a processor unit, comprising:
    transmitting the at least one data record from the external data source together with additional information to a buffer memory of the processor unit, the additional information including an identifier assigned individually to the processor unit;
    performing, in the processor unit, a check of an admissibility of a use of the at least one data record based on the additional information;
    generating a blocking signal when the check indicates that the use of the at least one data record is not allowed;
    deleting the at least one data record from the buffer memory; and
    generating an enable signal when the use of the at least one data record is allowed;
    comparing the identifier, transmitted together with the at least one data record, with a code word from a code word memory having a stored list of code words, the code word memory being of the processor unit to determine whether the use of the at least one data record at the processor unit is allowed, wherein with each check of the identifier in the processor unit another code word is used and therefore each code word identifier is valid only once and no longer available for use.

2. The method as recited in claim 1, wherein the identifier is valid only once for checking the at least one data record that has been transmitted and stored in the buffer memory.

3. The method as recited in claim 1, wherein when the enable signal has been generated, the at least one data record is transmitted from the buffer memory to a functional memory from which the at least one data record may be read.

4. The method as recited in claim 3, further comprising:
    storing the identifier and the at least one data record in the functional memory; and
    checking the identifier when calling up the at least one data record from the functional memory.

5. The method as recited in claim 1, further comprising:
    storing a list of code words in a code word memory of the processor unit;
    comparing the identifier with at least one of the code words; and
    determining a presence of validity when the at least one of the code words and the identifier match.

6. The method as recited in claim 5, further comprising:
    storing a counter content of a counter, wherein the counter points to one of the code words of the code word memory; and
    incrementing the counter content of the counter before each check of the identifier of the at least one data record stored in the buffer memory.

7. The method as recited in claim 1, further comprising:
    storing a list of code words in a code word memory of the processor unit; comparing the identifier with at least one of the code words; and
    determining a presence of validity when the at least one of the code words and the identifier are identical.

8. The method as recited in claim 1, wherein:
    the processor unit is identifiable by an identification sequence, and
    the identification sequence is part of the additional information and is used in the check of the at least one data record.

9. The method as recited in claim 1, further comprising:
    storing valid identifiers for the processor unit in an identifier server.

10. The method as recited in claim 1, further comprising:
    retrievably storing identifiers in a code word server for a plurality of counter contents of a counter, the identifiers being allocatable to the processor unit via an identification sequence.

11. A processor unit, comprising:
a buffer memory;
a rewritable functional memory that is accessible during an operation of the processor unit, the buffer memory and the rewritable function memory being capable of storing at least one data record;
an interface for importing the at feast one data record and additional information into the buffer memory; and
a check unit for checking a validity of the at least one data record;
a transmitting arrangement to transmit the at least one data record from the external data source together with additional information to a buffer memory of the processor unit, the additional information including an identifier assigned individually to the processor unit;
a checking arrangement to check an admissibility of a use of the at least one data record based on the additional information;
a generating arrangement to generate a blocking signal when the check indicates that the use of the at least one data record is not allowed; deleting the at least one data record from the buffer memory; and to generate an enable signal when the use of the at least one data record is allowed; and
a comparing arrangement to compare the identifier, transmitted together with the at least one data record, with a code word from a code word memory having a stored list of code words, the code word memory being of the processor unit to determine whether the use of the at least one data record at the processor unit is allowed, wherein with each check of the identifier in the processor unit another code word is used and therefore each code word identifier is valid only once and no longer available for use.

12. The processor unit as recited in claim 11, further comprising:
a counter including an incrementable counter content that points to one of the code words, wherein the processor unit is individualized via an identification sequence;
wherein the code word memory is a read only code word memory.

13. The processor unit as recited in claim 11, wherein the processor unit is a control unit of a motor vehicle.

* * * * *